Oct. 28, 1969   C. C. BUSENKELL ET AL   3,474,474
PLASTIC BODY AND PROCESS FOR MAKING THE SAME
Filed June 27, 1966                              2 Sheets-Sheet 1

INVENTORS
CHARLES C. BUSENKELL
WILLIAM L. MACKIE
BY *Howard J. Newby, Jr.* AGENT
*G. Baxter Warner*
ATTORNEY 3,474,474
PLASTIC BODY AND PROCESS FOR
MAKING THE SAME
Charles C. Busenkell, Camarillo, and William L. Mackie,
Ventura, Calif., assignors to the United States of
America as represented by the Secretary of the Navy
Filed June 27, 1966, Ser. No. 561,664
Int. Cl. B63b *21/52;* B63c *9/10;* C08g *22/46*
U.S. Cl. 9—8                                               7 Claims

ABSTRACT OF THE DISCLOSURE

A packaging arrangement wherein a plurality of separately encapsulated liquid chemicals are partially encompassed by a flexible plastic envelope which is in a normally collapsed condition. Means are provided for mixing these chemicals together to produce a foam-like substance which is emitted into the envelope to expand the latter and create a mass of material which, because of its low specific gravity, is ideally adapted for use as a float for supporting a structural member or assembly (such as a missile target) on the surface of a body of water.

---

The invention described herein may be manufactured and used by or for the Government of the United States of America for governmental purposes without the payment of any royalties thereon or therefor.

The present invention relates to plastic bodies and to a process for fabricating the same. An article produced by the method herein set forth has as one of its characteristics a low specific gravity, and hence finds particular utility as a float by means of which a structural member or assembly may be maintained in position on or above the surface of the sea or other body of water.

At the present time many types of air-to-surface missiles are operational, and numerous others are in various stages of development. Each one of these missiles must undergo a relatively extended period of testing in order to determine its performance characteristics in various environmental situations. Furthermore, the pilot of an aircraft on which certain missiles are carried must become proficient in launching the missile at the exact instant of time when it is most likely to impact a desired target. In order to meet these various requirements, it is customary for the pilot of a missile-carrying aircraft to practice launching the missile toward a target designed to simulate one which would be encountered in actual combat. For numerous reasons, such practice targets are often best located upon the surface of the ocean or other large body of water. Under such circumstances, tactical errors on the part of the aircraft pilot (malfunctioning of the missile itself, or the missile launching system) are less likely to result in destruction of property and/or injury to personnel taking part in the training or testing operation.

Sea targets presently used for testing purposes usually consist of barges made up of a number of steel pontoons bolted or welded to steel structural members. These barge-type targets normally weigh many tons, and impose severe logistic problems for the testing range in which they are located. For example, such targets must be transported to a given site, usually by towing behind a tug, and then must be moored in deep water. Since the towing operation must be carried out at slow speed, considerable time is required to bring the target to the desired location. Furthermore, maintenance and repair of such a structure is both costly and time-consuming. In addition, apart from the high initial cost of a single target of this type, it has been found that, after a direct hit from a missile, floating portions of the destroyed target can prove to be a navigational hazard.

There is consequently an urgent need for a low-cost, light-weight, expendable sea-borne target which is suitable for the testing of many types of missiles as well as for gunnery practice, and which does not possess the numerous disadvantages now inherent in targets of the type discussed above. It is consequently an objective of the present invention to provide a float for such a target, as well as a preferred method for fabricating the same.

In accordance with a feature of the present concept, a chemical packaging arrangement is provided which is capable of being processed to yield in effect a reinforced block of cellular plastic particularly suitable for use as a sea-borne target float. Among the advantages obtainable by employing a float produced in accordance with the method of the present invention is that the necessity for storing bulky space-consuming prefabricated floats is eliminated, and this is especially important when the floats are to be carried on board a vessel to a point where they are to be utilized. Storage space on board vessels is often at a premium, and, furthermore, handling of the target must often be accomplished under adverse weather conditions and by unskilled personnel.

In accordance with one embodiment of the present invention, a plurality of encapsulated liquid chemicals are partially encompassed by a flexible plastic envelope. In such a state, the overall size and weight of the assembly is such that it can be readily stored and handled. However, after being transported to an operational area with a minimum of effort and expense, a process is quickly and simply carried out by means of which the separately-encapsulated chemicals are mixed together to create a foam which expands to fill the flexible envelope. Within a short period of time, the foam hardens into a rigid mass of low specific gravity particularly adaptable for attachment to a lightweight target structure. Several of these floats are normally required to support the target strucure per se, and, after attachment, are capable of an extended life span with a minimum of repair or maintenance. Even if shattered by a direct hit from a missile, the float material is of such light weight and density that it constitutes no hazard to even a small vessel which might strike some sizable fragment thereof.

One object of the present invention, therefore, is to provide an improved method of forming plastic bodies particularly useful as floats to support a structure above the surface of a body of water.

Another object of the present invention is to provide a partially collapsible assembly designed with an enclosure containing at least two normally-separated chemical constituents which, when mixed together, form a foam-like plastic which is emitted into the enclosure to cause the assembly to expand from a collapsed condition.

A further object of the invention is to provide a float particularly adapted for use in supporting a target upon the surface of a body of water, such float being transportable to an operational area in collapsible form and then being activated in situ so as to create a mass of material having a low specific gravity and a volume considerably greater than that which the float possessed during transportation thereof.

An additional object of the invention is to provide an assembly including a pair of separate compartments each containing a liquid substance having a particular chemical composition, such two compartments being surrounded by a flexible plastic envelope, and to additionally provide means for mixing together the respective liquids in said compartments and for emitting the material so mixed to the interior of the plastic envelope to expand the same until it has reached a desired predetermined volumetric configuration.

Other objects, advantages, and novel features of the invention will become apparent from the following detailed description of the invention when considered in conjunction with the accompanying drawings wherein.

Figure 1:
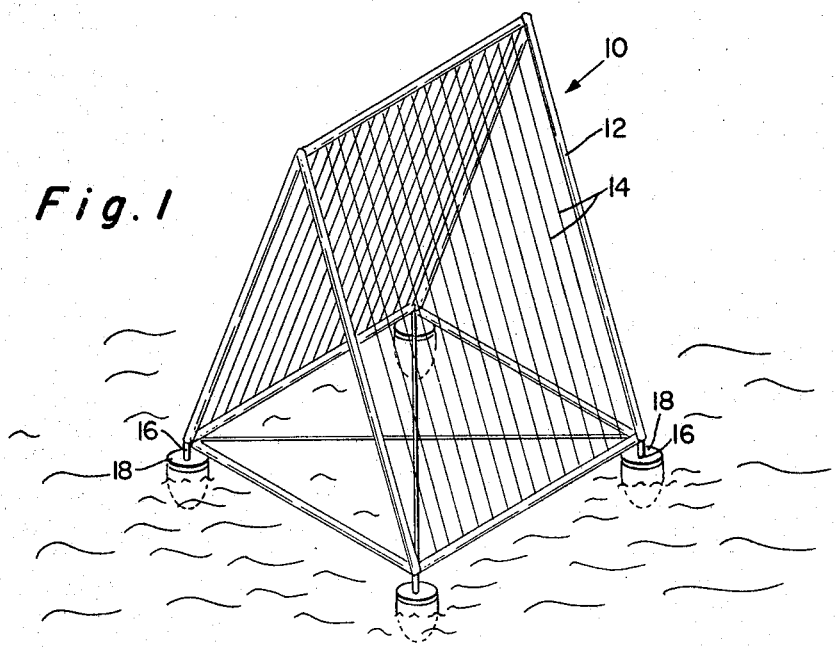
FIG. 1 is a perspective view of a representative target designed for location at sea, and supported by a plurality of floats which have been produced in accordance with the teaching of the present invention.

Referring first to FIG. 1 of the drawings, there is illustrated a sea-borne target structure 10 of a type to which the float design of the present invention is particularly applicable. This structure 10, intended for use as a missile and gunnery sea target, comprises a collapsible framework 12 made up of light-weight structural members between which is stretched a low-density netting or fabric material 14 of a color and composition selected so as to be visible at a distance to the pilot of a missile-launching aircraft, to the operator of a gun from which a projectile is to be fired, or to the operator of a radar system if the material of the target is reflective to electromagnetic energy. The generally rectangular lower portion of the framework 12 is provided with a plurality of downwardly-extending threaded adaptors 16 one of which is secured to each corner of the framework. Each of these adaptors 16 is attached to a float 18 the details of which form the subject matter of the present invention. Although the target 10 as illustrated and described herein is particularly suitable for use with the floats of the present concept, nevertheless it is being shown merely as an example, and many other types of structures may be substituted therefor. The only requirement is that they be capable of utilization on or above the surface of the sea or other body of water.

Figure 2:
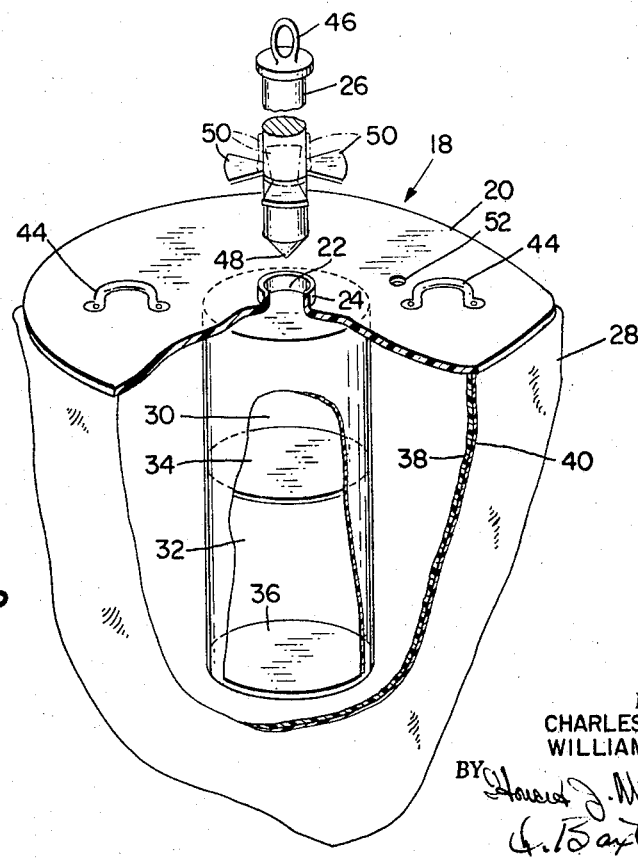
FIG. 2 is an enlarged perspective view, partly broken away, of a preferred form of float designed in accordance with the principles of the present invention, the respective float components of FIG. 2 being shown in a position such as they might assume while the device is being transported to a location where such float is to be utilized.
Figure 3:
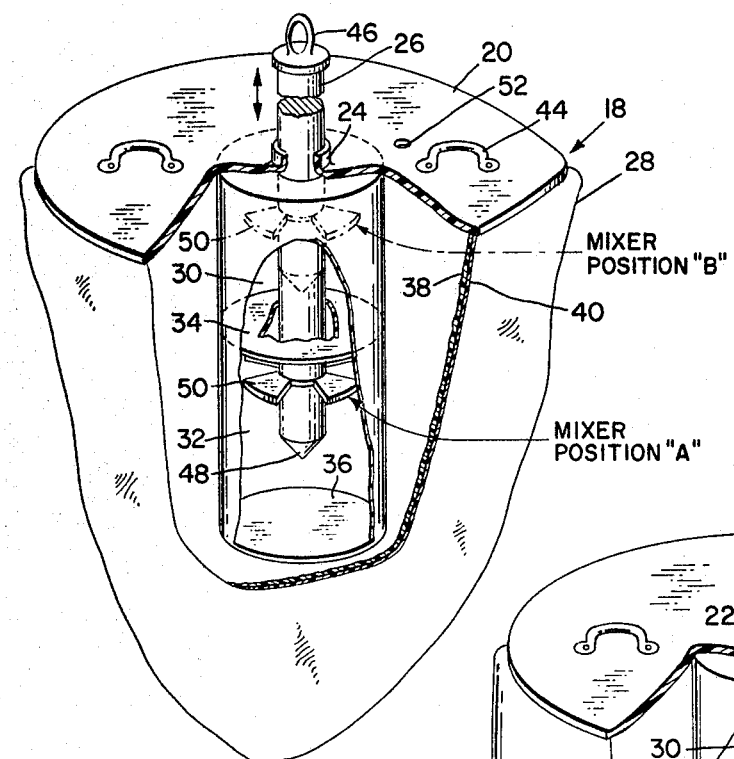
FIG. 3 is a view similar to that of FIG. 2, additionally bringing out the manner in which manual actuation of one of the elements of FIG. 2 is effective to bring about a mixing of the respective liquids enclosed within the float assembly so as to produce a foaming action.
Figure 4:
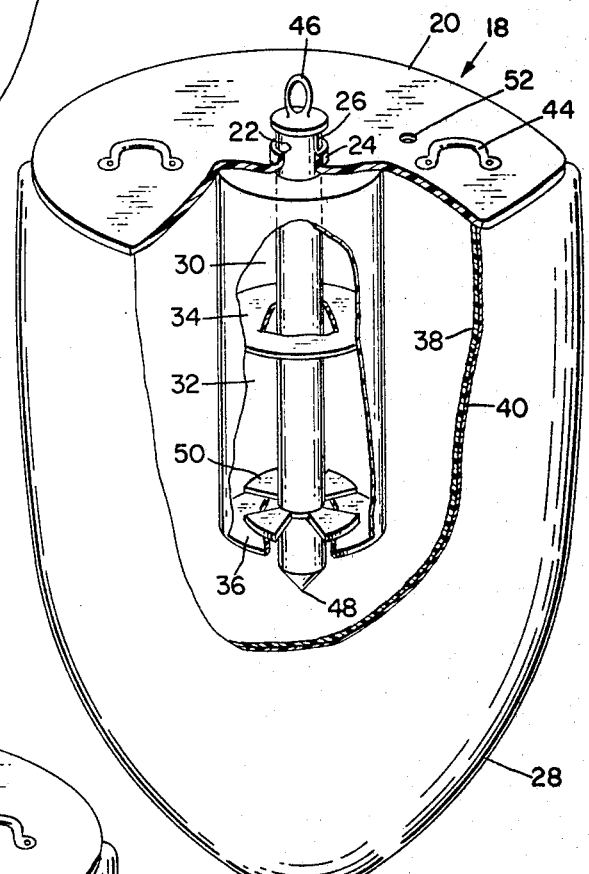
FIG. 4 is a view similar to that of FIGS. 2 and 3, additionally showing the manner in which further manual actuation of the element illustrated in FIG. 3 causes foam to fill the interior of the flexible envelope and results in the float assuming its final configuration as brought out in FIG. 1.

Details of the process by means of which the floats 18 of FIG. 1 are formed are shown in FIGS. 2, 3 and 4 of the drawings. Inasmuch as the structure of the float is closely related to the method by which the float is produced, both the latter and the product resulting therefrom will be included in a single description.

The flotation member of the present concept is shown in its initial or collapsed condition in FIG. 2 of the drawings. In other words, FIG. 2 illustrates the components of the device as they appear prior to the operation by means of which the float is caused to assume its final form. As shown, the float per se includes a rigid plate 20 composed of some suitable light-weight material such as molded plastic and is provided with a central opening 22 therein. A bushing or guide 24 in the opening 22 is intended to receive therewithin a plunger 26 the function of which will be set forth hereinafter in connection with a description of FIG. 3 of the drawings.

Secured to the periphery of the rigid plate 20 is a laminated envelope or bag 28 which is of a flexible nature and of a thickness preferably in the order of several hundredths of an inch. This envelope or bag 28 is cemented, electronically welded or otherwise securely attached to the plate 20 around the entire periphery thereof, so that, together with the plate 20, a partially collapsible enclosure is formed within which several further components of the device are contained. These components include a pair of containers or compartments 30 and 32 each of which may be cylindrical in form and axially aligned with one another in contiguous relationship, as shown in the drawing. Container 30 has one of its end walls cemented or otherwise securely affixed to the undersurface of the rigid plate 20, the common axis of the cylindrical containers 30 and 32 also coinciding with the axis of the opening 22 which, as above brought out, is adapted to receive the rod-like plunger 26. As also shown in the drawing, the respective containers 30 and 32 have a common wall 34 separating the respective interiors thereof, this wall 34 being composed of some material which is impervious to the liquid chemicals but can be readily ruptured or perforated. The lower end wall 36 of the container 32 is likewise composed of easily perforated material for reasons which will hereinafter appear.

Before proceeding further, it might be mentioned that the flexible envelope 28 is, as above brought out, preferably of double-wall design. It may be made up of an inner sheet 38 of woven material (such as fiber glass) which allows a semi-liquid substance such as foam to enter between the pores or strands thereof. Enclosing this inner porous layer may be an outer layer 40 also composed of plastic or other suitable material but of such a nature as to be both water- and gas-tight, so that sea water may not enter from exterior of the envelope 28 nor may any foam material within the enclosure pass outwardly therethrough.

Each of the containers 30 and 32 is intended to hold therewithin a chemical substance in liquid form. In accordance with a feature of the present concept, the respective chemical substances contained within these compartments are to be mixed together to form a foam (such as a polyether urethane foam) which is capable of hardening within a relatively short period of time to form a rigid mass which is insoluble in and impenetrable by water and which possesses a long life span. Furthermore, the specific gravity of a body produced in a manner hereinafter to be brought out in low, so that it will support a considerable weight on or above the surface of the sea. Purely as an example, the chemical substance in liquid form within the container 30 may be a mixture of liquid polyurethane plastic and a Freon, clorofluorinated hydrocarbon foaming agent. Also as an example, the chemical substance in liquid form within the container 32 may comprise a blend of tolylene diisocyanate, a catalyst and any desirable or necessary cell modifiers (surfactants). However, such chemical substances are well known in the art, and are merely mentioned as being suitable for use for the purpose herein described. Obviously, other chemical substances may be substituted therefor and will produce satisfactory results.

As will be apparent from the showing of FIG. 2 of the drawings, the plastic envelope 28 is collapsed prior to entry of the plunger 26 into the guide 24, and, consequently, the device is customarily transported to a site where it is to be employed as a target float with the flexible envelope 28 wrapped around the outer surface of the contiguous containers 30 and 32. This unit requires little storage space, and, due to its light weight, may be readily carried by a single individual who merely grips one or both of the handles 44 which are attached to the upper surface of the plate 20. The plunger or rod 26 is separately carried, and is manually placed in the position shown in FIG. 2 of the drawings when it is desired to prepare the unit for use with the target 10 of FIG. 1.

When it is desired to make ready the assembly of FIG. 2 as a float for a target, the unit which includes the cover plate 20 and envelope 28 is placed in the position shown. The rod or plunger 26 is then manually held by its handle 46 (which is screwed to the threaded upper portion of the plunger) and the pointed tip end 48 thereof inserted into the opening 22 so that the rod is guided by the bushing 24. Downward pressure applied to the rod 26 then causes the tip 48 to puncture the end wall of the container 30 which is cemented or otherwise secured to the under surface of the plate 20. It might be mentioned that the plunger 26 carries near the pointed tip 48 thereof a plurality of circumferentially-spaced mixing elements or "ears" 50 which extend radially outwardly from the rod and are either hinged to the body of the rod 26 or else made of some material which will bend upwardly (as shown in dotted lines in FIG. 2 of the drawings) when the rod 26 is inserted into the opening 22. As soon as the tip end 48 of the rod 26 has punctured one wall of the container 30, its downward movement is continued until the tip end 48 also punctures the common wall (or diaphragm) 34 which separates the respective interiors of the containers 30 and 32. This puncturing or rupturing of the wall 34 permits the radially-extending "ears" 50 to enter the interior of the container 32, where they assume a position such as shown in FIGURE 3 of the drawings. The wall 34 having been thus punctured or ruptured, the respective chemical substances in the containers 30 and 32 are now free to mix, and this mixing operation is intended to be facilitated by the action of the operator holding the handle 46. By imparting a pumping or reciprocating action to the rod 26, he can cause the respective chemical substances to more thoroughly mix due to the stirring action of the "ears" 50. In other words, this reciprocating action is carried out so as to cause the members 50 to alternately move between the limits designated in FIG. 3 of the drawings by positions A and B. After several cycles of thus mixing or stirring the respective substances originally separately contained within the cylindrical containers 30 and 32, a foaming action begins due to the chemical nature of the ingredients thus being combined. At this point, the rod 26 is inserted further into the opening 22 by the operator, and this further insertion of the rod 26 continues to a point where the tip end 48 of the rod punctures or ruptures the lower end wall 36 of the container 32. As soon as the wall 36 is thus ruptured, the foam which has been created within the common enclosure formed by the original containers 30 and 32 now passes into the interior of the enclosure formed by the cover plate 20 and the flexible envelope 28. The general movement of this foam is in a direction indicated by the arrows in FIG. 4 of the drawing. Continued emission of foam into the enclosure above described causes the flexible envelope 28 to expand outwardly, and, when sufficient foam has been produced, the envelope 28 will be completely filled with foam and will have the smooth outer surface configuration illustrated in FIG. 4 of the drawings. Sufficient amounts of the respective chemical substances are contained originally within the compartments 30 and 32 to produce foam of a volume adequate to fill the envelope 28, but, if any excess foam is developed, it may pass through the relief port 52 to preclude any possibility that the envelope 28 may be split or damaged by having too much internal pressure developed therewithin.

The plunger or rod 28 is allowed to remain in its position as shown in FIG. 4 of the drawings while the foam is filling the envelope 28, and, after a short period of time has elapsed, the foam will harden or solidify and tightly embed the lower portion of the rod 26 therewithin. In addition, the "ears" or mixing members 50 act to hold the rod 26 in place and to preclude its withdrawal after the foam has hardened. In other words, the rod 26 is now securely anchored to the remainder of the assembly.

Following the above-described operation, the handle 46 is unscrewed from the threaded upper portion of the rod 26, and the latter is ready for insertion into the threaded ends of the downwardly-extending adaptors 16 of FIG. 1. After the floats have been formed in the manner above described, the target 10 of FIG. 1 (to which the floats have been attached) is now ready for lowering from a vessel into the ocean or otherwise placing in position upon the surface of a body of water.

Although the time period required to complete the various steps of the above-described operation will, of course, vary in accordance with the nature of the particular chemicals employed, nevertheless, for those particular chemicals given above as an example, the plunger 26 is pumped up and down (or reciprocated) for approximately 10 seconds in order to mix and blend the chemicals. Expansion of the foam plastic into the envelope occurs rapidly, and after about 20 minutes the foam becomes rigid.

Although various materials may be employed for the double-walled envelope 28, it has been found in practice that the inner layer 38 may comprise a woven fiber glass fabric, while the outerlayer 40 may be a flexible plastic or paper envelope which is both water- and gas-tight. The gas-tight characteristic is usually desirable in order to maintain pressure during the foaming operation. The extrusion of foam through the inner woven fiber glass layer is permitted until the glass fabric is completely penetrated to create a firm bond therebetween. The outer surface of the resulting float is highly resistant to erosion and will require practically no maintenance over extended periods of time.

In the event that for some reason the float of FIG. 4 cannot be readily secured to the target 10 of FIG. 1 in the manner above described, the handles 44 provide an auxiliary means of attachment through the use of ropes, cables, etc. Such handles 44 also readily lend themselves to various strengthening expedients, such as the employment therewith of brackets attached to and extending downwardly from the structural members of the target.

Figure 5:
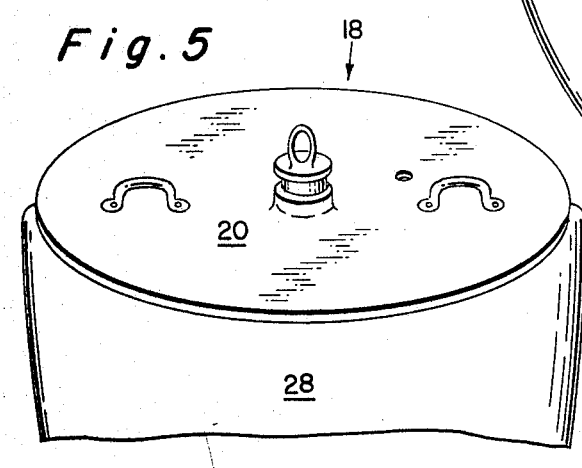
FIG. 5 illustrates an alternative configuration for the float of FIGS. 1 thru 4.

Obviously the dimensions of the various components of the device of FIGS. 2, 3 and 4 are not critical, and these dimensions can vary within wide limits. For example, the plate 20 need not be of elliptical configuration as shown in FIGS. 1 thru 4, but instead can be of circular outline as shown in FIG. 5. This yields better hydrodynamic properties, but is more difficult to tow to an operational site. However, with such a circular outline, there is maximum resistance to undesired movement of the target as a result of wind pressure, tides, and/or wave action, as no "weather vane" effect is present as in the case with floats possessing one or more flat essentially vertical surfaces. The type of material used for the containers 30 and 32 is likewise a matter of choice, and can be either a very thin metal or else some form of plastic film. Furthermore, it is contemplated that the end wall 36 of the container 32 may be formed of a material designed to burst or rupture as soon as the pressure of the foam within the containers 30 and 32 has reached a predetermined value. Under these conditions it will not be necessary to insert the plunger 26 through the end wall 36, as this rupturing of such wall will occur automatically as soon as the foam has reached a predetermined pressure level.

The outer flexible envelope 40 may in some cases be omitted as unnecessary, depending upon the texture of the inner envelope 38 and the desired smoothness of the outer surface of the float after the foam has hardened. However, the presence of the outer envelope 40 shapes the float and restricts it to a given configuration, as well as reinforcing the assembly and preventing subsequent abrasion of the outer float surface during use.

Various locking means can be incorporated in the structure of FIGS. 2, 3 and 4 to maintain the rod 26 at any point following its insertion into the opening 22. Inasmuch as such locking means are entirely conventional, they will not be described in the present specification.

Although the flexible envelope 28 has been illustrated and described as being of a flexible nature and secured to the periphery of the rigid cover plate 20, it is contemplated that a pair of spaced-apart rigid plates may be employed in parallel relationship to one another and with their respective peripheries connected by a flexible plastic sheet which in effect forms an interconnecting wall which is "flattened out" when the plastic foam fills the enclosure formed thereby in a manner such as above described. The plunger 26 may in such a case have its tip end threaded, and extend through an opening in the lower plate to receive a locking nut which maintains the entire assembly in a unitary condition. Other rods respectively receivable in aligned openings in the two plates may also be employed as a substitute for, or in addition to, the locked plunger reinforcing expedient. The two plates in such an embodiment should preferably, but not necessarily, have a similar peripheral configuration and be coextensive in area, but such considerations depend upon the demands placed upon the float by the environmental conditions under which the float is to be employed.

Although many desirable features of the invention will be apparent from the above description, it is believed that the following summary will be helpful in recognizing the many advantages obtained by use of the present concept:

(1) The necessity of storing bulky space-consuming prefabricated floats is eliminated;

(2) A self-energizing device is provided which permits the formation of the rigid foam plastic float directly from encapsulated liquid chemical elements;

(3) The device is safe, non-toxic, and can be readily operated by unskilled personnel;

(4) The device incorporates a built-in reinforcing sheath of rigid foam-impregnated fiberglass fabric;

(5) A self-anchored threaded fastener is provided for the attachment of the float to structural components of the target;

(6) Sealed reactive chemicals are provided which are packaged in precise proportions so as to assure correct density and cell structure to the cellular foam produced by mixing thereof;

(7) The degrading effect of moisture on isocyanate foam chemicals is eliminated by packaging these chemicals in moisture-resistant unbreakable containers;

(8) The personnel hazards associated with the emission of toxic tolylene diisocyanate gas, which is formed when the plastic foam chemical components are mixed by conventional methods in open containers, are eliminated;

(9) A long shelf life is assured together with freedom from repair problems; and

(10) The target can be assembled on land or on board a vessel and air-lifted by helicopter to the site where it is to be used.

Obviously many modifications and variations of the present invention are possible in the light of the above teachings. It is therefore to be understood that the invention may be practiced otherwise than as specifically described.

We claim:
1. The combination of:
a rigid supporting plate;
an envelope of flexible material secured to the periphery of said plate so as to form a partially collapsible enclosure;
a pair of containers supported in contiguous relationship with one another within said enclosure, said pair of containers having a common wall separating the respective interiors thereof;
said plate having an opening therein aligned with said pair of containers;
a first chemical ingredient within one of said containers;
a second chemical ingredient within the other of said containers, at least one of said ingredients being in fluid form;
an agitator insertable into the opening in said plate from exterior of said enclosure;
said agitator being designed to rupture the said common wall separating the respective interiors of said pair of containers upon insertion of said agitator into the opening in said plate for a first predetermined distance;
means responsive to a reciprocating movement of said agitator after the latter has been inserted into the opening in said plate for said first predetermined distance to mix the ingredients within the respective containers to produce a plastic foam;
said agitator being additionally designed for further insertion into said plate for a second predetermined distance greater than said first predetermined distance to rupture a further wall of said containers and allow the entry of said foam into the enclosure formed by said plate and said flexible envelope so as to fill such enclosure and cause said flexible envelope to expand from its collapsed condition and assume approximately a predetermined volumetric configuration,
said foam having the property of hardening into a rigid mass having a low specific gravity.

2. The combination of claim 1, in which the said pair of containers are each cylindrical in form and are contiguously disposed in axial alignment with one another.

3. The combination of claim 2 in which said pair of containers are supported by said plate.

4. The combination of claim 3 in which the opening in said plate is of annular outline and centrally located, with the said pair of cylindrical containers having their common axis aligned with the axis of the opening in said plate.

5. The combination of claim 4, in which said agitator is designed for manual actuation, and is of rod-like form with a pointed tip end insertable in the opening in said plate and designed to rupture the common wall separating said containers.

6. The combination of claim 5, in which said agitator is provided with a plurality of radially-extending mixer elements carried thereby in the tip region thereof.

7. The combination of claim 6, in which said envelope is double-walled, the inner wall being of woven plastic and the outer wall being of a material impervious to both liquids and gases.

References Cited
UNITED STATES PATENTS

| | | | |
|---|---|---|---|
| 1,490,157 | 4/1924 | Cherniak | 9—324 |
| 1,791,136 | 2/1931 | Magnin | 9—327 X |
| 3,059,253 | 10/1962 | Sager | 9—8 |
| 3,150,387 | 9/1964 | Look et al. | 9—8 |

MILTON BUCHLER, Primary Examiner

JEFFREY L. FORMAN, Assistant Examiner

U.S. Cl. X.R.

9—314, 324, 327; 260—2.5